United States Patent
Athreya et al.

(10) Patent No.: US 12,118,494 B1
(45) Date of Patent: Oct. 15, 2024

(54) SYSTEM AND METHOD FOR MITIGATING RISK ASSOCIATED WITH A MACHINE-GENERATED FORECAST

(71) Applicant: Asper.AI Inc., New York, NY (US)

(72) Inventors: Guha Athreya, Bangalore (IN);
Yadunath Gupta, Bangalore (IN);
Vibhor Mishra, Jersey City, NJ (US);
Pooja Jayaprakash, Palak (IN); Raul Jurado, El Calvario (MX)

(73) Assignee: Asper.AI Inc., New York, NY (US)

( * ) Notice: Subject to any disclaimer, the term of this patent is extended or adjusted under 35 U.S.C. 154(b) by 0 days.

(21) Appl. No.: 18/531,183

(22) Filed: Dec. 6, 2023

(30) Foreign Application Priority Data

Sep. 25, 2023 (IN) .............................. 202321064320

(51) Int. Cl.
*G06Q 10/06* (2023.01)
*G06Q 10/04* (2023.01)
*G06Q 10/0635* (2023.01)

(52) U.S. Cl.
CPC ......... *G06Q 10/0635* (2013.01); *G06Q 10/04* (2013.01)

(58) Field of Classification Search
CPC .................................................... G06Q 10/06
See application file for complete search history.

(56) References Cited

U.S. PATENT DOCUMENTS

2013/0253979 A1* 9/2013 Williams ........... G06Q 10/0635
705/7.28
2015/0120373 A1 4/2015 Bajaj et al.
2016/0260109 A1* 9/2016 Feng ................... G06Q 30/0202
2017/0091790 A1* 3/2017 Ray ..................... G06Q 30/0202
2020/0184494 A1 6/2020 Joseph et al.
(Continued)

FOREIGN PATENT DOCUMENTS

| CA | 3214018 A1 * | 12/2022 | ............. G06Q 30/01 |
| WO | WO-2022259033 A1 * | 12/2022 | |
| WO | WO-2023275879 A1 * | 1/2023 | ............. G06Q 10/08 |

OTHER PUBLICATIONS

Clausen et al., Unlocking hidden value in product portfolios, A practical approach for CPGs to drive profitability by striking the right balance between variety and complexity, strategy& Part of the PwC network, http://www.strategyand.pwc.com/, 2019. (Year: 2019).*

*Primary Examiner* — Kurtis Gills

(74) *Attorney, Agent, or Firm* — Shumaker, Loop & Kendrick, LLP

(57) ABSTRACT

A system and a method for mitigating risk associated with a machine-generated forecast. The system may receive data comprising at least one of product attributes, historical demand for a set of Stock Keeping Units (SKUs), a machine-generated forecast for the set of SKUs, and historical forecast adjustment for the set of SKUs. Further, the system may determine one or more metrics based on the received data. The one or more metrics are fed to a risk analyzer model. A Demand Planning Risk Index (DPRI) score for an SKU from the set of SKUs may be generated using the risk analyzer model. The DPRI score indicates a risk quotient for the SKU. Further, a forecast adjustment for the SKU with a high risk quotient may be recommended to mitigate the risk associated with the machine-generated forecast of the SKU.

17 Claims, 5 Drawing Sheets

(56) References Cited

U.S. PATENT DOCUMENTS

| | | | |
|---|---|---|---|
| 2020/0242511 A1 | 7/2020 | Kale et al. | |
| 2021/0089985 A1* | 3/2021 | Gu | G06N 20/00 |
| 2022/0405775 A1* | 12/2022 | Siebel | G06Q 30/01 |
| 2022/0414590 A1* | 12/2022 | Melancon | G06Q 10/06313 |

* cited by examiner

SYSTEM AND METHOD FOR MITIGATING RISK ASSOCIATED WITH A MACHINE-GENERATED FORECAST

PRIORITY INFORMATION

The present application claims a priority from Indian Patent Application No. 202321064320 dated Sep. 25, 2023.

TECHNICAL FIELD

The present subject matter described herein, in general, relates to mitigating risk associated with a machine-generated forecast.

BACKGROUND

The present disclosure addresses the challenges retail businesses face in effectively managing their inventory stock to meet customer demand while minimizing costs. Proper inventory management is crucial to ensure that sufficient items are available to meet customer demands without incurring the costs associated with excess stock or stockouts.

In the retail industry, it is essential to maintain an optimal inventory level to meet customer demand and maximize profitability. Insufficient stock levels can result in lost sales opportunities and dissatisfied customers, negatively impacting the retail business. On the other hand, excessive stock can lead to increased warehousing costs, inefficient use of space, and potential losses due to obsolescence. Hence, accurate forecasting of customer demand and inventory sales is vital for achieving the right balance in inventory stock.

Existing forecast models rely on various data sources, such as merchant data, warehouse data, sales data, and logistics data, to predict customer demand. While these factors significantly determine customer demand and sales, there is always a risk of forecast errors. The forecast errors arise from uncertainties that the existing forecast models fail to consider, resulting in an overestimation or underestimation of expected demand in the future. Consequently, inventory stock may be excessive or insufficient, leading to financial losses and operational inefficiencies.

There is a pressing need for a solution that accounts for the impact of various scenarios on inventory stock to mitigate forecast errors and achieve an optimal balance between inventory stock and customer demand. Such a solution should consider all possible uncertainties and their potential effects on inventory levels. By doing so, it can minimize forecast errors, thereby striking a balance between excess inventory and insufficient inventory.

In summary, the disclosed system and method address the inefficiencies and limitations of existing demand planning systems by quantifying forecast risk, providing insights to demand planners, and facilitating more informed forecast adjustments. By incorporating various scenarios and considering their impact on inventory stock, this solution aims to minimize forecast errors and balance excessive and insufficient inventory levels.

SUMMARY

Before the present system(s) and method(s), are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for mitigating risk associated with a machine-generated forecast. This summary is not intended to identify essential features of the claimed subject matter, nor is it intended for use in determining or limiting the scope of the claimed subject matter.

In one implementation, a method for mitigating risk associated with a machine-generated forecast is disclosed. The method may comprise receiving data comprising at least one of product attributes, historical demand for a set of Stock Keeping Units (SKUs), a machine-generated forecast for the set of SKUs, and historical forecast adjustment for the set of SKUs. Further, one or more metrics based on the received data may be determined. The one or more metrics are fed to a risk analyzer model. Further, a Demand Planning Risk Index (DPRI) score for an SKU from the set of SKUs may be generated using the risk analyzer model. The DPRI score may indicate a risk quotient for the SKU. Further, a forecast adjustment for the SKU with a high risk quotient may be recommended to mitigate the risk associated with the machine-generated forecast of the SKU. In one aspect, the aforementioned method for mitigating risk associated with a machine-generated forecast may be performed by a processor using programmed instructions stored in a memory.

In another implementation, a non-transitory computer-readable medium embodying a program executable in a computing device for mitigating risk associated with a machine-generated forecast is disclosed. The program may comprise a program code for receiving data comprising at least one of product attributes, historical demand for a set of Stock Keeping Units (SKUs), a machine-generated forecast for the set of SKUs, and historical forecast adjustment for the set of SKUs. Further, the program may comprise a program code for determining one or more metrics based on the received data. The one or more metrics may be fed to a risk analyzer model. The program may comprise a program code for generating a Demand Planning Risk Index (DPRI) score for an SKU from the set of SKUs using the risk analyzer model. The DPRI score may indicate a risk quotient for the SKU. Further, the program may comprise a program code for recommending a forecast adjustment for the SKU with a high risk quotient to mitigate the risk associated with the machine-generated forecast of the SKU.

The disclosed system addresses a technical problem in demand planning, which involves the identification of focus areas that can create maximum value and the need for relevant metrics and information for optimal adjustments. In order to solve this problem, the system determines the Demand Planning Risk Index (DPRI) score, which quantifies the risk associated with forecasted demand for any SKU. The DPRI score serves as a solution to measure and evaluate the risk level in forecasted demand. Additionally, the system anticipates the questions that demand planners may have when adjusting machine-generated forecasts and utilizes machine learning to score the relevance of these questions. The generated scores aid in prioritizing the most pertinent questions based on the specific situation. Furthermore, the system presents the answers to these relevant questions in a user-friendly interface, ensuring that demand planners can easily access the information needed for optimal adjustments.

BRIEF DESCRIPTION OF THE DRAWINGS

The foregoing detailed description of embodiments is better understood when read in conjunction with the appended drawings. For the purpose of illustration of the present subject matter, an example of a construction of the present subject matter is provided as figures. However, the invention is not limited to the specific method and system for mitigating risk associated with a machine-generated forecast disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "determining," "generating," "recommending," "classifying," "assessing," and other forms thereof are intended to be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for mitigating risk associated with a machine-generated forecast. The system may receive data associated with a demand planning process. Further, the system may determine one or more metrics based on the received data. The one or more metrics may comprise, but are not limited to, an accuracy, a bias, an average actual demand, and an average machine-generated forecasted demand associated with an SKU. Further, the one or more metrics may be used to train a machine-learning model. Furthermore, the machine learning model may be utilized to generate a Demand Planning Risk Index (DPRI) score for the SKU from the set of SKUs. The DPRI score may indicate a risk quotient associated with a forecast of the SKU. Further, the system may classify, based on the risk quotient, the SKUs between a high risk and a low risk. The SKUs having DPRI score above a threshold risk quotient are marked as the high risk. When the system determines that the SKU is high-risk, the system may guide the demand planner to make appropriate forecast adjustments to mitigate the risk associated with the high-risk SKU. The forecast adjustments may be generated using Natural Language Generation (NLG) techniques.

Figure 1:
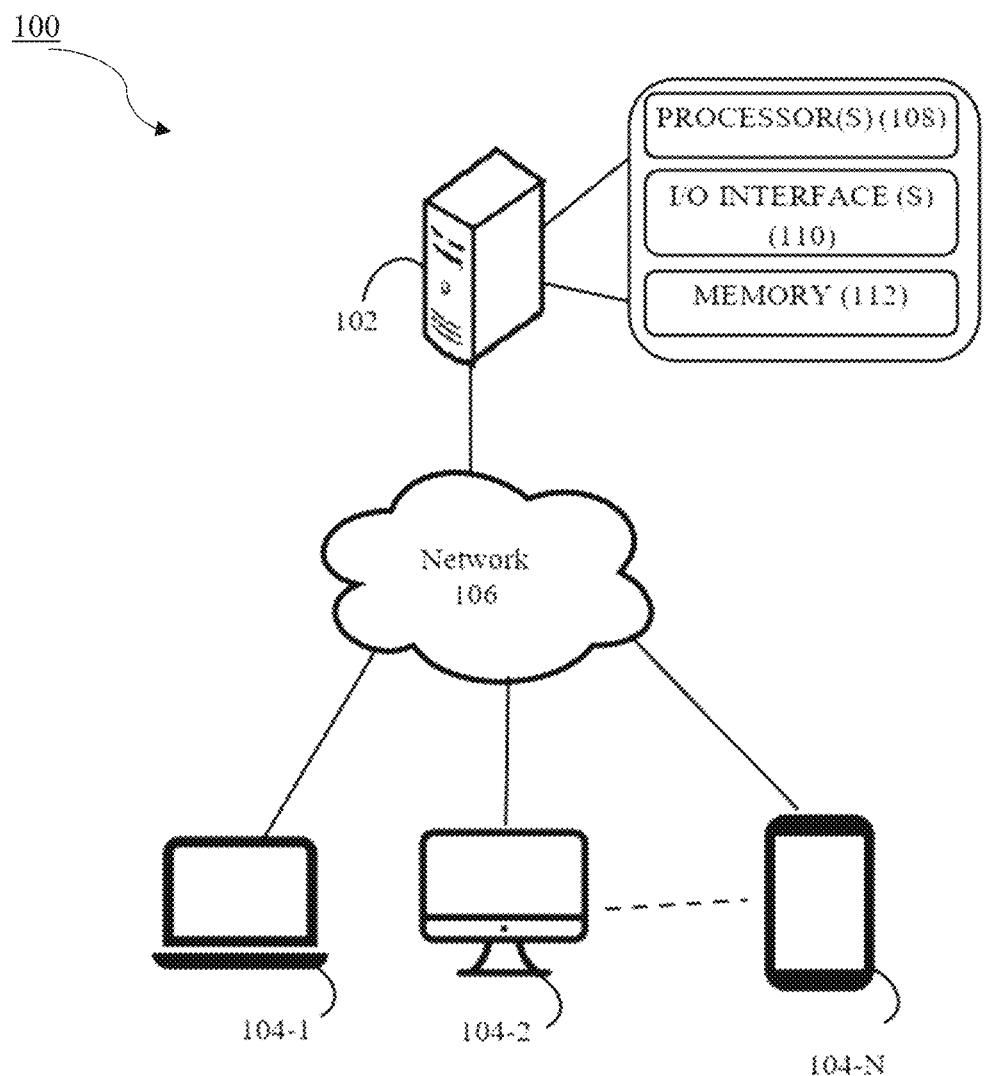
FIG. 1 illustrates a network implementation for mitigating risk associated with a machine-generated forecast, in accordance with an embodiment of the present subject matter.

Referring now to FIG. 1, a network implementation 100 of a system 102 for mitigating risk associated with a machine-generated forecast is disclosed. Initially, the system 102 receives data associated with a demand planning process. The data may comprise at least one of product attributes, historical demand for a set of Stock Keeping Units (SKUs), a machine-generated forecast for the set of SKUs, and historical forecast adjustment for the set of SKUs. It may be noted that the one or more users may access the system 102 through one or more user devices 104-1, 104-2, 104-3 . . . 104-N, collectively referred to as user devices 104, hereinafter, or applications residing on the user devices 104. The system 102 may receive data associated with a demand planning process from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as Wireless Local Area Network (WLAN), cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read-only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for mitigating risk associated with a machine-generated forecast. At first, a user may use the user device 104 to access the system 102 via the I/O interface 110. The user may register the user devices 104 using the I/O interface 110 in order to use the system 102. In one aspect, the user may access the I/O interface 110 of the system 102. The detailed functioning of the system 102 is described below with the help of figures.

The present subject matter describes the system 102 for mitigating risk associated with a machine-generated forecast. Initially, the system may receive data associated with a demand planning process. The data may comprise at least one of product attributes, historical demand for a set of Stock Keeping Units (SKUs), a machine-generated forecast for the set of SKUs, and historical forecast adjustment for the set of SKUs. It may be noted that the machine-generated forecast for the set of SKUs is for past and future time periods. Further, the historical forecast adjustment for the set of SKUs may be provided by a demand planner for historical periods.

Further to receiving the data, the system 102 may determine one or more metrics based on the received data. The one or more metrics may comprise an accuracy, a bias, an average actual demand, an average machine-generated forecasted demand, a difference in the machine-generated forecast of last two times, a difference between the accuracy of an adjusted forecast of the SKU when compared to the machine-generated forecast of the same SKU.

In an embodiment, the accuracy of the machine-generated forecast over past t time steps may be determined based on the below formula:

$$\text{Accuracy} = (\Sigma(\text{abs}(\text{forecast}-\text{actuals})))/(\Sigma(\text{actuals}))$$

In the above equation, "forecast" refers to the predicted or estimated values for an SKU generated by the machine for a particular time step. Further, "actuals" refer to the observed or real values that were recorded or measured for the same time step.

Further, the bias of the machine-generated forecast over past t time steps may be determined based on the below formula:

$$\text{Bias} = \Sigma(\text{forecast}-\text{actuals})/(\Sigma(\text{actuals}))$$

Similarly, the system 102 may determine the average actual demand over past t time steps, the average machine-generated forecasted demand over next t time steps, a change or a difference in the machine-generated forecast compared to the same forecast generated in previous iterations. Furthermore, the system may also determine the difference in accuracy of the demand planner adjusted forecast for last period of a given SKU versus the machine-generated forecast for the last period of the same SKU. In an example, the period may be a week, a month, or a year. The system may determine all the metrics in real-time without any human intervention.

Further, the one or more metrics may be fed to a risk analyzer model. The risk analyzer model may be trained based on the one or more metrics and labeled data of SKUs categorized into one or more risk classes comprising a high risk and a low risk. The risk analyzer model may be a machine learning model configured to determine a risk associated with the SKU.

In an alternate embodiment, the risk analyzer model may be a rule-based model or an equation-based model. When a set of rules is provided, the risk analyzer model may be formulated as an equation that captures the business perspective and closely replicates the ordering of SKUs defined by the rules. In cases where training data is available, but the quantity is insufficient to train a machine learning model effectively, the risk analyzer model may be defined as an equation that aligns with the business perspective and accurately fits the available training data.

When sufficient training data is available along with labels comprising SKUs classified as high-risk and low-risk labels, any machine learning algorithm suitable for classifying the SKUs can be employed to train the risk analyzer model. The machine learning algorithm may comprise, but not limited to, Linear Regression, Decision Trees (such as Random Forest and Gradient Boosting), Support Vector Machines (SVM), Gradient Boosting Models such as Extreme Gradient Boosting (XGBoost), or light gradient-boosting machine (LightGBM), Neural Networks (such as Convolutional Neural Networks and Recurrent Neural Networks), and Ensemble Methods (like Random Forest and Gradient Boosting). It may be noted that each algorithm may offer different capabilities and can be chosen based on factors such as data type, problem complexity, available training data, and desired outcomes. The algorithms may learn the ranking patterns from the training data and determine a risk associated with the SKU.

Further to training the risk analyzer model, the system 102 may generate a Demand Planning Risk Index (DPRI) score for an SKU from the set of SKUs using the risk analyzer model. The DPRI score may indicate a risk quotient for the SKU.

The DPRI score for an SKU may be represented as below:

$$\text{DPRI score}=f(\text{Accuracy, Bias, and other one or more metrics})$$

Further to generating the DPRI score, the system may classify the SKUs between a high risk and a low risk. The SKUs are classified as high risk SKU and low risk SKU based on the generated risk quotient (DPRI). Further, the SKUs having the DPRI score above a threshold are marked as the high risk. Furthermore, the SKUs with high DPRI score are also referred to as High Touch SKUs. In an example and not by way of any limitation, the SKUs categorized as High Touch require manual intervention by default unless the demand planner chooses to accept the forecast without any changes.

In an alternate embodiment, the system 102 may automatically determine the threshold risk quotient for a company/SKU/product category based on the historical forecasting trends and historical DPRI scores.

In an embodiment, the SKUs with low DPRI scores are considered to have low risk and are also referred to as Low Touch. In an example and not by way of any limitation, the machine-generated forecast is accepted by default for low-touch SKUs, with a provision for manual intervention if the demand planner chooses to make adjustments. In an embodiment, the system may not perform any actions on the low-risk SKUs.

When the risk analyzer model (DPRI model) is a ranking model for ranking the SKUs as high risk and low risk, the system may convert the DPRI score into risk categories based on some rules. Below are some example rules that may be considered:

In an embodiment, the SKUs with the DPRI score above a predefined threshold may be categorized as a high risk. The remaining SKUs are classified as a low-risk. In yet another embodiment, the SKUs falling within the top X percentile of the DPRI score are designated as the high risk, wherein X is determined based on a capacity of the demand planners available to review the forecasts. Further, SKUs beyond X percentile may be categorized as the low risk.

By applying the rules, the system may convert the obtained ranks into meaningful risk categories, enabling demand planners to prioritize resources on SKUs with the high risk. The selection and fine-tuning of these rules can be tailored to the specific needs and preferences of the business.

Consider an example, a company has more than 15000 SKUs. The company wants to determine the high-risk SKUs by determining a DPRI score for each SKU. In the example, the company may provide one or more metrics to determine the DPRI score. Let us assume that the one or more metrics comprise (a) the minimum accuracy of the SKUs over the last 3 months (hereinafter referred to as Accuracy) (b) average bias of SKUs over last 3 months (hereinafter referred to as Bias) (c) total demand over last 3 months (hereinafter referred to as Volume) and (d) change in the machine-generated forecast for t+2 months compared to the same forecast generated in previous iteration (hereinafter referred to as Deviation). Further, construe that the company requirement is that 50% of SKUs should be low risk or low touch, and 50% of SKUs tagged as low touch must have accuracy above 60%.

Based on the one or more metrics and company requirements the risk analyzer model for the company may be defined as below:

$$\text{DPRI}=\log(1+\text{Volume})^a \times (1-\text{Accuracy})^b \times (1+\text{abs}(\text{Bias}))^c \times (1+\text{Deviation})^d$$

Condition={Low Touch, if
(SKU is high selling and DPRI<T1)
or
(SKU is low selling and DPRI<T2)
High Touch, otherwise}

It may be noted that a, b, c, d, T1, and T2 are the parameters that can be tuned to fit the guidelines of the company. T1 and T2 are threshold parameters T1 and T2.

Further to classifying the SKU, the system may assess the machine-generated forecast of the SKU with high risk with a pre-defined set of rules to identify one or more reasons for the SKU being classified as the high risk. The system may rank the one or more reasons based on relevancy using a machine learning model. The machine learning model may be trained based on historical data of SKUs and corresponding forecasts of the SKUs, and the reasons for classifying the SKUs as high-risk. Further, the machine learning model may be a classification algorithm, such as logistic regression, or random forest, or a deep learning model like a Convolutional Neural Networks. Further, the machine learning model may be trained periodically using new training data to improve its performance and adapt to evolving patterns and trends in the high-risk classification.

In an example, the system may generate the following types of reasons for classifying the SKU as the high-risk:

A) Factors contributing to a high DPRI score for the SKU: The system may identify specific factors that contribute to the high DPRI score. Examples of such factors include low accuracy, high bias, and high volatility.

b) Anomalies in recent demand patterns: The anomalies include examining the timing and magnitude of spikes or troughs in the demand data. Further, known causes or external factors influencing the anomalies may also be identified. The anomalies provide valuable insights into potential risks arising from sudden changes in customer demand.

Further to identifying the one or more reasons for the SKU being classified as the high risk, the system 102 may recommend a forecast adjustment for the SKU with a high risk quotient to mitigate the risk associated with the machine-generated forecast of the SKU. In an embodiment, the system may store a set of recommendations mapped to one or more reasons for the SKU being classified as high-risk. When the system determines the reason for SKU being high risk, the system identifies at least one recommendation from the set of recommendations for the demand planner. Further, the high-risk SKU, the identified recommendation and the reason for SKU being classified as high risk is provided as an input to a Natural Language Processing (NLP) model to generate a story or a document for the demand planner. In an embodiment, the story may be communicated via text or voice interface.

In another embodiment, an Insight Generation model may be used to recommend forecast adjustments (or generate one or more insights) related to an SKU. The Insight Generation model may be a Machine Learning model. Further, the model may be trained based on a training dataset comprising a set of recommendations mapped to one or more reasons for one or more SKUs being classified as high-risk. Further, the model may be continuously trained over a period of time when new reasons or recommendations related to the high-risk SKUs are available.

The forecast adjustments or insights may be displayed to the demand planner on a display of the user-device 104 using Natural Language Generation (NLG) technique. In an embodiment, one or more natural language processing models may be used to recommend the forecast adjustment. The one or more natural language processing models may comprise, but are not limited to, Bidirectional Encoder Representations from Transformers (BERT), Robustly Optimized BERT-Pretraining Approach (ROBERTa), Generative Pre-Trained Transformer (GPT), Amazon Comprehend (AWS Comprehend), Google Cloud Natural API, an Information Retrieval model, a Semantic Textual Similarity model, and a Paraphrase Identification.

Below are a few examples of insights generated (maybe referred to as forecast adjustment recommendations or generating guidance) by the system, for demand planner, for mitigating the risk associated with the machine-generated forecast for the SKU:
a) Consider increasing the value of forecasted sales because machine-generated (or model) forecasts for the SKU have been significantly lower than the actual sales for the past several periods.
b) Maintain the forecasted sale within a range of 100 to 180 units because the model has 95% confidence that the actual sale for the SKU would fall within this range.
c) Consider reducing the forecast for the upcoming sale event because model has shown tendency to over-forecast sales for the SKU during large sale events.
d) Validate or adjust the forecasted value in the context of the significant price increase planned for a given SKU in the next month. The model has never seen this kind of price increase in history. So the impact of price may not be correctly captured by the model.
e) Adjust the forecast of the given SKU to account for the impact of 2 degree Celsius higher temperature projected for the next three months in the region than the same months last year. Model doesn't use temperature as an input driver and, therefore cannot account for the impact of temperature change in the demand.
f) There has been a consistent decline in month-on-month volume for the category of given SKU over the last six months. The model is forecasting demand for the SKU, assuming the declining trend will continue over the coming months. We recommend the demand planner validate the category trend and accordingly make adjustments to the forecast of the SKU.

In an example, the system may display the forecast adjustments using NLG to the demand planner. Consider an example, the system identifies an SKU (e.g., laptop) with a high forecast bias. The system may generate a forecast adjustment recommendation and display to the demand planner using NLG. In the example, the forecast adjustment recommendation may be displayed to the demand planner such as:

Based on the historical sales data for the laptop SKU, the forecasted demand consistently deviates from the actual sales figures. To address this issue, make forecast adjustments based on customer buying patterns, seasonal variations, and market trends specific to laptops. Also, the demand planner must consider external factors like competitor pricing, technological advancements, and customer reviews can help refine the forecast accuracy.

By incorporating the above adjustments, the demand planner can optimize inventory levels, reduce stockouts or excess inventory, and enhance customer satisfaction with improved availability of the laptop SKU.

Further to generating one or more recommendations or insights for an SKU to mitigate the risk, the system may rank the one or more insights, based on relevancy, by using a ranking algorithm. The system may apply the ranking model to assign a rank or a score to each insight. The ranking algorithm takes into account one or more factors comprising an impact of the insight, feasibility of implementation, and a potential effectiveness in mitigating the risk. The system may consider the one or more factors to determine the relevance and importance of each insight. Once the ranking process is completed, the system may display the most useful insights to the demand planner.

Let us assume that the system generates 15 insights to mitigate the risk associated with the SKU. Further, the system may rank the generated insights and display only 5 most useful insights to the demand planner. The ranking process ensures that the demand planner can efficiently prioritize their actions and make informed decisions based on the insights that are most likely to drive positive outcomes. Thus, the system assists the demand planner in effectively managing the SKU's risk and optimizing their forecasting and planning strategies.

In an embodiment, the system may recommend indicators for necessary adjustments. In an example, the indicators may comprise, but not limited to, the SKU's past tendency to over forecast or under forecast, average forecasting errors, and confidence intervals. The confidence interval represents a statistically estimated range within which the demand is likely to fall with a 95% confidence level. The indicators provide guidance on the magnitude and direction of adjustments required to mitigate the risk associated with the SKU's machine-generated forecast.

Consider an example, the system receives data related to 5 clothing products (SKUs): Sweaters, T-Shirts, Jeans, Dresses, and Hoodies. The data includes product attributes, historical demand for each clothing product, a machine-generated forecast, and historical forecast adjustments.

Further, the system may determine the one or more metrics, for each clothing product, comprising Accuracy, Bias, Average Actual Demand, Average Machine-Generated Forecasted Demand. The below table shows the one or more metrics:

| Clothing Product | Accuracy | Bias | Average Actual Demand | Average Machine-Generated Forecasted Demand |
|---|---|---|---|---|
| Sweater | 0.85 | −0.05 | 50 | 45 |
| T-Shirt | 0.78 | 0.12 | 80 | 70 |
| Jeans | 0.92 | −0.02 | 60 | 65 |
| Dress | 0.76 | 0.08 | 30 | 35 |
| Hoodie | 0.81 | −0.15 | 40 | 50 |

Further, the system may generate the Demand Planning Risk Index score (DPRI), using the risk analyzer model, for each clothing product. The DPRI score for each product is shown below:

| Clothing Product | DPRI Score |
|---|---|
| Sweater | 0.80 |
| T-Shirt | 0.95 |

-continued

| Clothing Product | DPRI Score |
|---|---|
| Jeans | 0.90 |
| Dress | 0.84 |
| Hoodie | 0.68 |

Further, let's assume that a predefined DPRI score threshold to categorize clothing products as high risk is 0.85. Clothing products with a DPRI score equal to or above the threshold will be considered high risk, while those below the threshold will be categorized as low risk. In the example, T-shirts and Jeans may be classified as high-risk products.

In the example, the system may generate one or more reasons for classifying Jeans and T-shirt as high-risk SKU. The one or more reason may comprise at least one of:

Low Accuracy: The machine-generated forecasts for "T-shirts" have consistently deviated from the actual demand, indicating a low level of accuracy in forecasting.

High Bias: There is a significant bias in the machine-generated forecasts for "Jeans," resulting in consistently overestimating or underestimating the demand for this SKU.

High Volatility: The demand patterns for "Jeans" exhibit high volatility, with frequent and unpredictable fluctuations in demand, making it challenging to accurately forecast the sales.

Further to identifying the reasons, the system may recommend adjustments (or generate insights) for high-risk clothing products to mitigate the risks associated with their machine-generated forecasts. The specific adjustment recommendations will depend on the analysis of the metrics and historical patterns. The recommendations may be at least one of revising inventory levels, adjusting pricing strategies, or implementing targeted marketing campaigns to address the potential risks for the identified high-risk clothing products.

In the example, the high-risk SKUs are "Jeans" and "T-shirts" with a DPRI score above the threshold. Below are the insights generated by the system, for demand planner, for mitigating the risk associated with the machine-generated forecast for the "Jeans" SKU:

a) Consider increasing the value of forecasted sales because machine-generated forecasts for the SKU have consistently underestimated the actual sales in previous periods.

b) Consider reducing the forecast for the upcoming sale event because the model has shown a tendency to over-forecast sales for the SKU during large sale events.

c) Validate or adjust the forecasted value in the context of the significant price increase planned for a given SKU in the next month. The model has not encountered such a price increase before, indicating that the impact of the price change may not be accurately captured.

Similarly, the system may also generate insights, for the demand planner, to mitigate the risk associated with the machine-generated forecast for the "T-shirts" SKU.

In an embodiment, the system may determine the DPRI score for each SKU. Further, the system may arrange the SKUs based on their DPRI scores. Furthermore, the system may display the top 10 SKUs that are high-risk to the demand planners. In an example, let us assume that a company has 25 SKUs. The system may determine DPRI scores for each SKU. Further, the system may sort or arrange the SKUs based on their DPRI scores. Such a method may be useful for the demand planner to quickly identify the SKU having high-risk or the top 10 SKUs having high risk.

Figure 2:
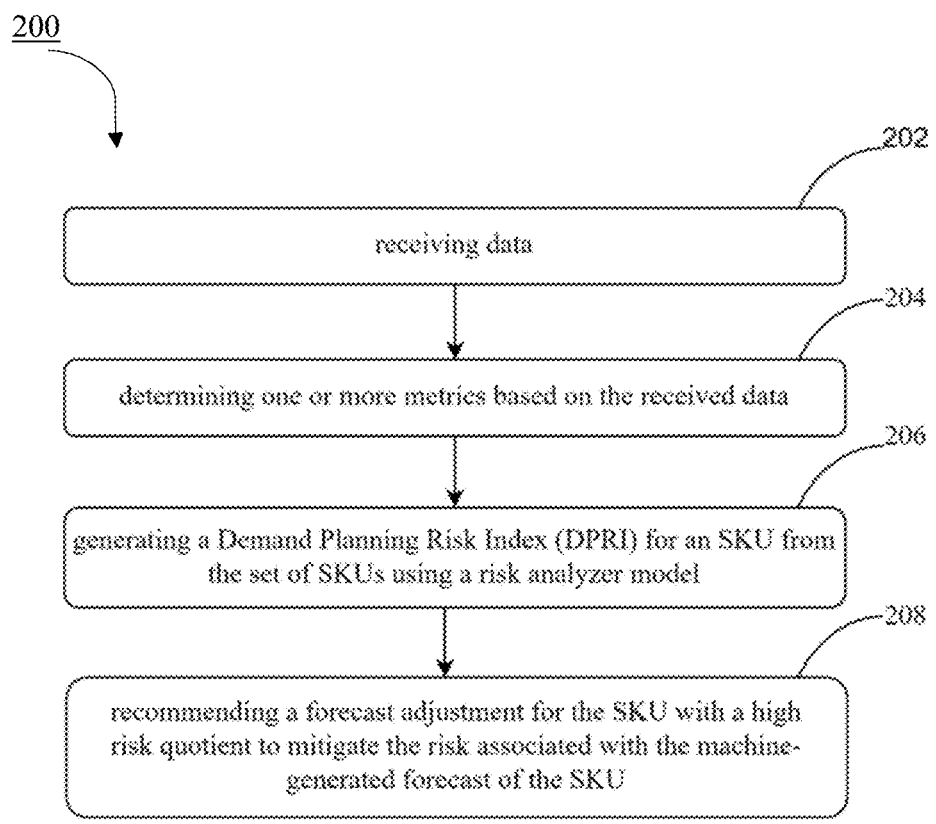
FIG. 2 illustrates a method for mitigating risk associated with a machine-generated forecast, in accordance with an embodiment of the present subject matter.

Referring now to FIG. 2, a method 200 for mitigating risk associated with a machine-generated forecast is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for mitigating risk associated with a machine-generated forecast. Additionally, individual blocks may be deleted from the method 200 without departing from the scope of the subject matter described herein. Furthermore, the method 200 for mitigating risk associated with a machine-generated forecast can be implemented in any suitable hardware, software, firmware, or combination thereof. However, for ease of explanation, in the embodiments described below, the method 200 may be considered to be implemented in the above-described system 102.

At block 202, data comprising at least one of product attributes, historical demand for a set of Stock Keeping Units (SKUs), a machine-generated forecast for the set of SKUs, and historical forecast adjustment for the set of SKUs may be received.

At block 204, one or more metrics based on the received data may be determined. The one or more metrics are fed to a risk analyzer model. The one or more metrics may comprise an accuracy, a bias, an average actual demand, an average machine-generated forecasted demand, a difference in the machine-generated forecast of last two times, a difference between the accuracy of an adjusted forecast of the SKU when compared to the machine-generated forecast of the same SKU.

At block 206, a Demand Planning Risk Index (DPRI) score for an SKU from the set of SKUs may be generated using the risk analyzer model. The DPRI score may indicate a risk quotient for the SKU. The risk analyzer model may be a machine learning model. Further, the risk analyzer model may be configured to determine a risk associated with the SKU. The risk analyzer model may be trained based on the one or more metrics and labeled data of SKUs categorized into one or more risk classes comprising a high risk and a low risk.

At block 208, a forecast adjustment for the SKU with a high risk quotient may be recommended to mitigate the risk associated with the machine-generated forecast of the SKU.

Figure 3:
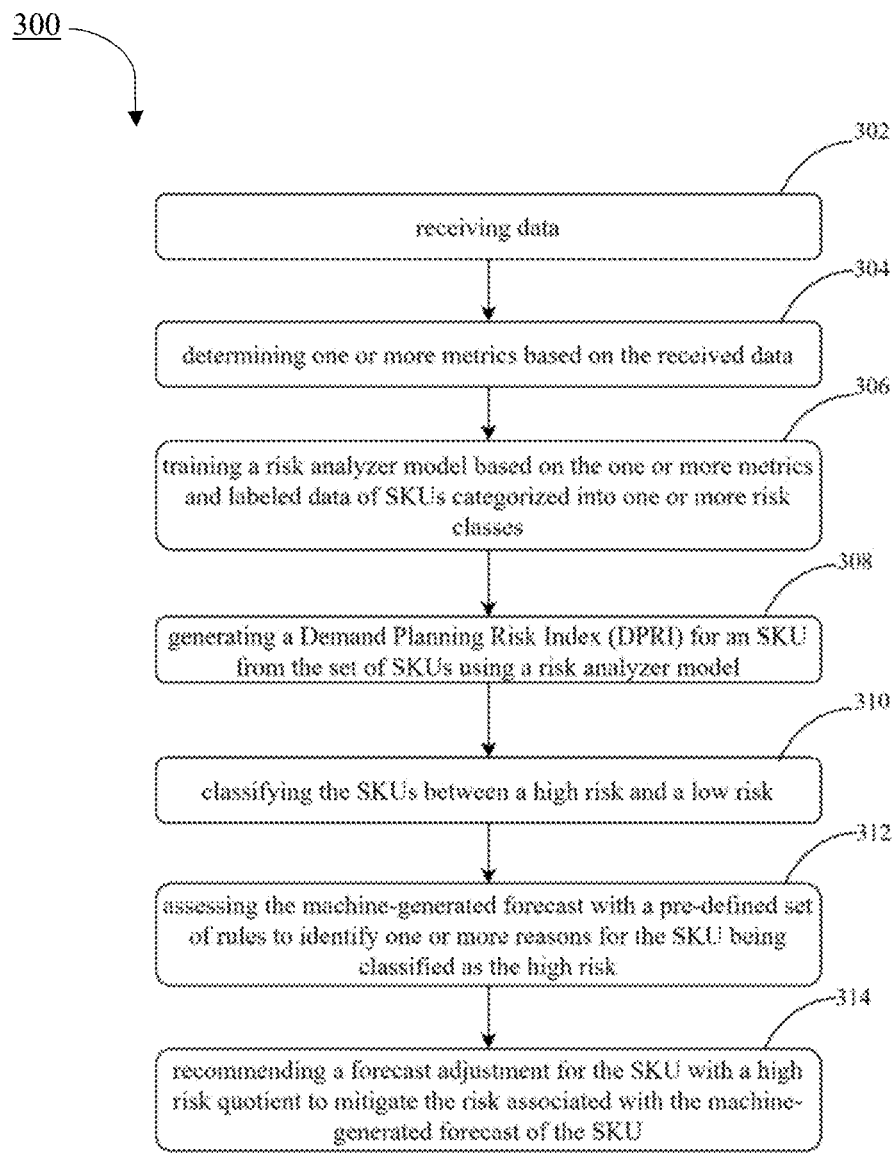
FIG. 3 illustrates another embodiment for mitigating risk associated with a machine-generated forecast, in accordance with an embodiment of the present subject matter.

Referring now to FIG. 3, yet another method 300 for mitigating risk associated with a machine-generated forecast is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for mitigating risk associated with a machine-generated forecast. Additionally, individual blocks may be deleted from the method 300 without departing from the scope of the subject matter described herein. Furthermore, the method 300 for mitigating risk associated with a machine-generated forecast can be implemented in any suitable hardware, software, firmware, or combination thereof. However, for ease of explanation, in the embodiments described below, the method 300 may be considered to be implemented in the above-described system 102.

At block 302, data comprising at least one of product attributes, historical demand for a set of Stock Keeping Units (SKUs), a machine-generated forecast for the set of SKUs, and historical forecast adjustment for the set of SKUs may be received.

At block 304, one or more metrics based on the received data may be determined. The one or more metrics are fed to a risk analyzer model. The one or more metrics may comprise an accuracy, a bias, an average actual demand, an average machine-generated forecasted demand, a difference in the machine-generated forecast of last two times, a difference between the accuracy of an adjusted forecast of the SKU when compared to the machine-generated forecast of the same SKU.

At block 306, a risk analyzer model may be trained based on the one or more metrics and labeled data of SKUs categorized into one or more risk classes.

At block 308, a Demand Planning Risk Index score (DPRI score) may be generated for an SKU from the set of SKUs using the risk analyzer model.

At block 310, the SKUs may be classified between a high risk and a low risk.

At block 312, the machine-generated forecast may be assessed with a pre-defined set of rules to identify one or more reasons for the SKU being classified as the high risk.

At block 314, a forecast adjustment for the SKU with a high risk quotient may be recommended to mitigate the risk associated with the machine-generated forecast of the SKU.

Figure 4:
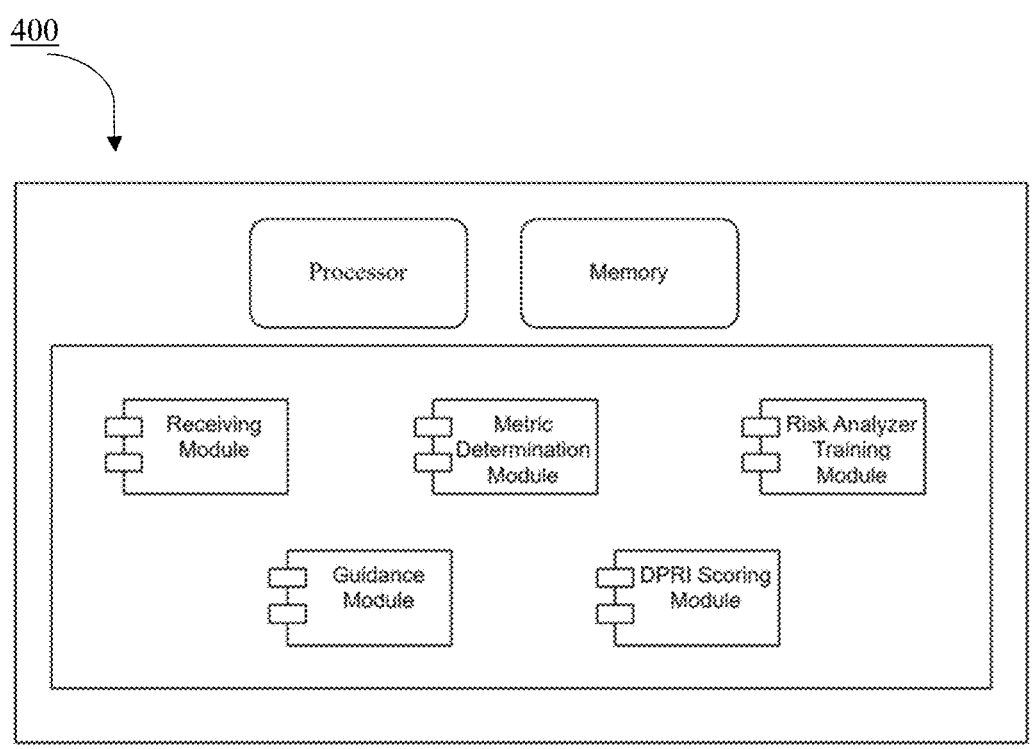
FIG. 4 illustrates a block diagram depicting a method for mitigating risk associated with a machine-generated forecast, according to an embodiment of the present disclosure.

FIG. 4 illustrates a block diagram 400 depicting a method for mitigating risk associated with a machine-generated forecast, according to an embodiment of the present disclosure. The block diagram comprises a memory, a processor, a receiving module, a metric determination module, a risk analyzer training module, a DPRI scoring module, and a guidance module.

The receiving module may be configured to receive data associated with a demand planning process. The data may comprise at least one of product attributes, historical demand for a set of Stock Keeping Units (SKUs), a machine-generated forecast for the set of SKUs, and historical forecast adjustment for the set of SKUs.

The metric determination module may be configured to calculate one or more metrics from the received data. The one or more metrics comprise an accuracy, a bias, an average actual demand, an average machine-generated forecasted demand, a difference in the machine-generated forecast of last two times, a difference between the accuracy of an adjusted forecast of the SKU when compared to the machine-generated forecast of the same SKU.

Further, a risk analyzer training module may be configured to train the risk analyzer model. The risk analyzer model takes one or more metrics for an SKU as input and gives a score or label as output representing a Demand Planning Risk Index (DPRI) score associated with the SKU.

DPRI scoring module may be configured to generate the DPRI score for at least one SKU using the trained risk analyzer model. The one or more metrics described under the metric determination module are determined and passed as an input to the trained risk analyzer model (or DPRI model) that gives DPRI score for the SKU as output.

Guidance module may be configured to guide the demand planners to make appropriate forecast adjustments to mitigate the risk associated with high-risk SKUs.

Figure 5:
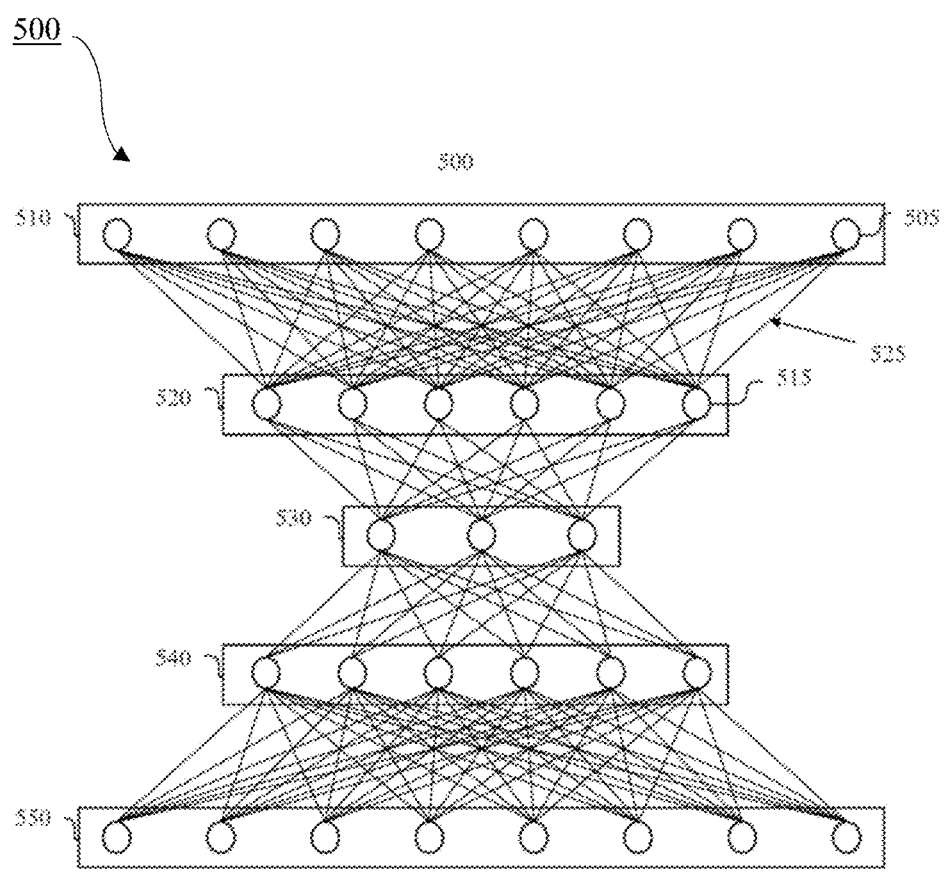
FIG. 5 illustrates an example artificial neural network, in accordance with an embodiment of the present subject matter.

FIG. 5 illustrates an example artificial neural network ("ANN") 500 of the deep learning algorithms. In an embodiment, the ANN may be used for generating a Demand Planning Risk Index (DPRI) score for an SKU from the set of SKUs. In particular embodiments, an ANN may refer to a computational model comprising one or more nodes. Example, ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

For generating the DPRI using the ANN, the neural network may be trained using a sequence of training data, which may include historical demand patterns, machine-generated forecasts, and relevant data related to an SKU. The input layer receives the input data, which is then processed through the hidden layers, consisting of interconnected nodes, leveraging the network's ability to learn complex patterns and relationships. The output layer produces the DPRI score, representing the calculated risk associated with the forecasted demand for a specific SKU.

Consider an example of a Jeans SKU. Let's assume that collected data for jeans comprises product attributes (e.g., brand, style, size), historical demand (number of units sold), machine-generated forecasts, and historical forecast adjustments over a specific period. Based on the collected data, determining the metrics comprising forecast accuracy, bias, volume, deviation and other metrics related to the SKU. Further, an ANN architecture with input data, hidden, and output layers may be configured for the DPRI calculation. The input layer would have nodes corresponding to the selected metrics (accuracy, bias, volume, deviation, and other metrics related to the SKU). The ANN is trained using a dataset that includes the historical metrics as input and the corresponding DPRI scores for jeans as the target output. The training process involves adjusting the weights and biases of the ANN based on the provided data to minimize the difference between the predicted DPRI scores and the actual DPRI scores. Once the ANN is trained, input the metrics (accuracy, bias, volume, and deviation related to the SKU) for the SKU into the trained ANN. The output of the ANN will be the DPRI score, representing the calculated risk associated with the forecasted demand for that particular pair of jeans.

In particular embodiments, the ANN employed for generating DPRI may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block $N-1$, x may be the input into residual block $N-1$. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the risk analyzer model may be an ANN. The ANN may be trained using training data comprising the one or more metrics related to the SKUs and labeled data of SKUs categorized into one or more risk classes comprising a high risk and a low risk. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method enable efficient classification of SKUs into high risk and low risk categories based on the DPRI score. The SKU classification simplifies the decision-making process for demand planners and enables them to prioritize their actions and resources effectively.

Some embodiments of the system and the method enable assessment of the machine-generated forecast using company-defined rules to identify specific reasons for classifying an SKU as high risk. This helps demand planners understand the factors contributing to the risk and take targeted actions to mitigate potential issues.

For SKUs classified as high risk, the system recommends forecast adjustments to mitigate the associated risk. The recommendations guide demand planners in making informed adjustments to improve the accuracy and reliability of the forecasts, ultimately reducing potential risks.

The generation of the DPRI score for each SKU provides a standardized measure of risk, allowing demand planners to prioritize their focus and resources accordingly. The DPRI score provides a quick and consistent way to identify SKUs with higher risk levels.

The system receives various kinds of data, including product attributes, historical demand, machine-generated forecasts, and forecast adjustments. The data provides a holistic analysis of the SKUs, enabling more accurate risk assessment.

Although implementations for methods and system for mitigating risk associated with a machine-generated forecast have been described in language specific to structural features and/or methods, it is to be understood that the appended claims are not necessarily limited to the specific features or methods described. Rather, the specific features and methods are disclosed as examples of implementations for mitigating risk associated with a machine-generated forecast.

The invention claimed is:

1. A method for mitigating risk associated with a machine-generated forecast, the method comprises:
receiving data comprising at least one of product attributes, historical demand for a set of Stock Keeping Units (SKUs), a machine-generated forecast for the set of SKUs, and historical forecast adjustment for the set of SKUs;
determining one or more metrics based on the received data, wherein the one or more metrics comprises an accuracy, a bias, a difference between accuracy of an adjusted forecast of an SKU when compared to the machine-generated forecast of the SKU;

training a risk analyzer model using a machine learning algorithm, wherein the machine learning algorithm is trained based on two or more of the determined metrics and labeled data of the set of SKUs categorized into one or more risk classes comprising a high risk and a low risk, and wherein the risk analyzer model is configured to generate a Demand Planning Risk Index (DPRI) score indicating a risk quotient for respective SKUs of the set of SKU;

generating a Demand Planning Risk Index (DPRI) score for one or more SKUs from the set of SKUs using the risk analyzer model;

identifying the one or more SKUs with high-risk quotient based on respective DPRI scores exceeding a threshold risk quotient; and recommending a forecast adjustment for the identified one or more SKUs with high risk quotient to mitigate the risk associated with the machine-generated forecast of those SKU.

2. The method of claim 1, wherein the one or more metrics further comprise an average actual demand, an average machine-generated forecasted demand, and a difference in the machine-generated forecast of last two times.

3. The method of claim 1, wherein generating the DPRI score for the SKU further comprises classifying, based on the risk quotient, the one or more SKUs between a high risk and a low risk.

4. The method of claim 3, wherein classifying the one or more SKUs further comprises assessing the machine-generated forecast of the one or more SKU with high risk with a pre-defined set of rules to identify one or more reasons for the one or more SKU being classified as the high risk.

5. The method of claim 4, further comprises ranking the one or more reasons based on relevancy using a machine learning model.

6. The method of claim 1, wherein a low DPRI score indicates a low risk associated with the one or more SKUs, and wherein the one or more SKUs with the low DPRI score is classified as a low touch.

7. The method of claim 1, wherein a high DPRI score indicates a high risk associated with the one or more SKU, and wherein the one or more SKUs with the high DPRI score is classified as a high touch.

8. A system for mitigating risk associated with a machine-generated forecast comprising:
 a memory; and
 a processor coupled to the memory, wherein the processor is configured to execute program instructions stored in the memory to:
  receive data comprising at least one of product attributes, historical demand for a set of Stock Keeping Units (SKUs), a machine-generated forecast for the set of SKUs, and historical forecast adjustment for the set of SKUs;
  determine one or more metrics based on the received data, wherein the one or more metrics comprises an accuracy, a bias, a difference between accuracy of an adjusted forecast of an SKU when compared to the machine-generated forecast of the SKU;
  training a risk analyzer model using a machine learning algorithm, wherein the machine learning algorithm is trained based on two or more of the determined metrics and labeled data of the set of SKUs categorized into one or more risk classes comprising a high risk and a low risk, and wherein the risk analyzer model is configured to generate a Demand Planning Risk Index (DPRI) score indicating a risk quotient for respective SKUs of the set of SKU;
  generate a Demand Planning Risk Index (DPRI) score for one or more SKUs from the set of SKUs using the risk analyzer model;
  identifying one or more SKUs with high-risk quotient based on respective DPRI scores exceeding a threshold risk quotient; and
  recommend a forecast adjustment for the identified one or more SKUs with a high risk quotient to mitigate the risk associated with the machine-generated forecast of those SKU.

9. The system of claim 8, wherein the one or more metrics comprise an average actual demand, an average machine-generated forecasted demand, and a difference in the machine-generated forecast of last two times.

10. The system of claim 8, wherein generating the DPRI score for the one or more SKUs further comprises classifying, based on the risk quotient, the one or more SKUs between a high risk and a low risk.

11. The system of claim 10, wherein classifying the one or more SKUs further comprises assessing the machine-generated forecast of the one or more SKUs with high risk with a pre-defined set of rules to identify one or more reasons for the one or more SKUs being classified as the high risk.

12. The system of claim 11, further comprises ranking the one or more reasons based on relevancy using a machine learning model.

13. The system of claim 8, wherein a low DPRI score indicates a low risk associated with the one or more SKUs, and wherein the one or more SKUs with the low DPRI score is classified as a low touch.

14. The system of claim 8, wherein a high DPRI score indicates a high risk associated with the one or more SKUs, and wherein the one or more SKUs with the high DPRI score is classified as a high touch.

15. A non-transitory computer program product having embodied thereon a computer program for mitigating risk associated with a machine-generated forecast, the computer program product storing instructions for:
 receiving data comprising at least one of product attributes, historical demand for a set of Stock Keeping Units (SKUs), a machine-generated forecast for the set of SKUs, and historical forecast adjustment for the set of SKUs;
 determining one or more metrics based on the received data, wherein the one or more metrics comprises an accuracy, a bias, a difference between accuracy of an adjusted forecast of an SKU when compared to the machine-generated forecast of the SKU;
 training a risk analyzer model using a machine learning algorithm, wherein the machine learning algorithm is trained based on two or more of the determined metrics and labeled data of the set of SKUs categorized into one or more risk classes comprising a high risk and a low risk, and wherein the risk analyzer model is configured to generate a Demand Planning Risk Index (DPRI) score indicating a risk quotient for respective SKUs of the set of SKU;
 generating a Demand Planning Risk Index (DPRI) score for an SKU from the set of SKUs using the risk analyzer model;
 identifying one or more SKUs with high-risk quotient based on respective DPRI scores exceeding a threshold risk quotient; and recommending a forecast adjustment for the identified one or more SKUs with a high risk quotient to mitigate the risk associated with the machine-generated forecast of those SKUS.

16. The method of claim 1, wherein recommend the forecast adjustment comprises:
   identify one or more reasons for each high-risk SKU being classified as high-risk;
   access a stored set of recommended forecast adjustments mapped to the one or more reasons for an SKU being classified as high-risk; and
   select, from the stored set, at least one recommended forecast adjustment corresponding to the identified one or more reasons for each high-risk SKU.

17. The system of claim 8, wherein recommending the forecast adjustment comprises:
   identifying one or more reasons for each high-risk SKU being classified as high-risk;
   accessing a stored set of recommended forecast adjustments mapped to the one or more reasons for an SKU being classified as high-risk; and
   selecting, from the stored set, at least one recommended forecast adjustment corresponding to the identified one or more reasons for each high-risk SKU.

* * * * *